United States Patent
Radzik

[11] Patent Number: 6,139,069
[45] Date of Patent: Oct. 31, 2000

[54] UNIVERSAL MECHANICAL COUPLING WITH INTERFITTING ENDS

[75] Inventor: Joseph G. Radzik, Easton, Pa.

[73] Assignee: Central Sprinkler Corporation, Lansdale, Pa.

[21] Appl. No.: 09/138,431

[22] Filed: Aug. 24, 1998

[51] Int. Cl.[7] .................................................. F16L 17/04
[52] U.S. Cl. ........................ 285/112; 285/367; 285/906
[58] Field of Search .................................... 285/112, 411, 285/367, 906; 24/279–282, 284

[56] References Cited

U.S. PATENT DOCUMENTS

| | | |
|---|---|---|
| 1,331,986 | 2/1920 | Griffin . |
| 2,362,454 | 11/1944 | Damsel . |
| 4,163,571 | 8/1979 | Nash . |
| 4,326,737 | 4/1982 | Lehmann . |
| 4,391,458 | 7/1983 | Blakeley . |
| 4,408,788 | 10/1983 | Beukema . |
| 4,527,818 | 7/1985 | Rundell ................................ 285/411 X |
| 4,611,839 | 9/1986 | Rung et al. . |
| 4,702,499 | 10/1987 | DeRaymond et al. .................. 285/367 |
| 4,861,075 | 8/1989 | Pepi et al. . |
| 4,896,902 | 1/1990 | Weston . |
| 4,915,418 | 4/1990 | Palatchy . |
| 4,940,261 | 7/1990 | Somers Vine . |
| 4,966,395 | 10/1990 | Hendrickson . |
| 5,018,768 | 5/1991 | Palatchy . |
| 5,031,755 | 7/1991 | Blakeley . |
| 5,104,153 | 4/1992 | Corcoran . |
| 5,246,257 | 9/1993 | Kojima et al. . |

OTHER PUBLICATIONS

*Field Assembly and Installation Instruction Pocket Handbook*, Victaulic Company of America, Easton, PA, Sep. 1995, front cover, rear cover and pp. 50–51.

*Primary Examiner*—Dave W. Arola
*Attorney, Agent, or Firm*—Akin, Gump, Strauss, Hauer & Feld, L.L.P.

[57] ABSTRACT

Segmented pipe couplings are formed by two or more identical arcuate pipe coupling segments. Each end of each segment is matable to either end of each other segment. Each end has a tongue and a recess generally on opposite sides of a longitudinal central plane of the segment. The positioning of the tongue and recess is reversed with respect to the central plane at opposite ends of each segment. Each recess is slightly larger than the tongue to receive the tongue of an identical coupling. A double tongue-double recess interfit is formed when any coupling segment is coupled together with an identical coupling segment. Either end of any coupling segment can mate with either end of other coupling segment and form a proper connection between segments.

22 Claims, 7 Drawing Sheets

UNIVERSAL MECHANICAL COUPLING WITH INTERFITTING ENDS

BACKGROUND OF THE INVENTION

This invention relates generally to a mechanical coupling with interfitting ends for use in coupling the ends of two abutting pipes or other similar items.

It is well known in the art to use a segmented coupling comprising two or more coupling segments to extend over the ends of abutting pipes, and to compress the coupling segments into a sealing relation with the external circumference of the aforementioned pipes to form a leak-proof bond between coupling and the two pipes.

It is also well known in the art to provide an interfitting relationship between the ends of the coupling segments in order to provide a more positive coupling force between the coupling segments. This interfitting relationship is generally accomplished by a tongue and recess arrangement. Generally, each coupling segment has a tongue centered on one end and a recess centered on the other end. Two identical coupling segments are intended to be mated together with the tongue of a first segment fitting into the recess of a second segment and the tongue of the second segment fitting into the recess of the first segment. The interfit of the tongue and recess provides proper alignment of the coupling segments with respect to each other and also provides a stronger connection between the coupling segments.

Although the two mating coupling segments are identical, it is still possible for them to be installed together incorrectly. It is quite possible for a workman in the field to inadvertently attempt to mate the tongue of the first coupling segment with the tongue of the second coupling segment and consequently mate the recess of the first coupling segment with the recess of the second coupling segment. This results in an improper coupling of the pipe ends and will most likely result in a fluid leak from the ends of the pipes.

Accordingly, there is a need to be able to mate identical coupling segments in an arrangement without regard to the orientation of each segment end with respect to either end of the other segment to form a segmented coupling and still form a leak-proof seal between the ends of the pipes.

BRIEF SUMMARY OF THE INVENTION

In one aspect, the present invention is a coupling segment comprising an arcuate body having a first end and a second end; a concave surface extending between the first end and the second end; a longitudinal central plane extending from the first end to the second end; and a tongue and a recess located side-by-side on each end, with the tongue being generally on an opposite side of the longitudinal central plane from the recess, wherein the positioning of the tongue and recess are reversed with respect to the central plane at opposite ends of each segment. Each recess is slightly larger than the tongue to receive the tongue of an identical coupling segment and form a tongue-recess interfit when the coupling segment is coupled together with the identical coupling segment.

In a second aspect, the invention is a circular segmented pipe coupling comprising a plurality of identical coupling segments, each segment having a first end and a second end, each end having a tongue and a recess, joined end to end, with the tongue of each end of each coupling segment interfitted into the recess of an adjoining end of each adjacent identical coupling segment of the plurality; and a mechanical fastener located on an outer circumference of the coupling defined by the plurality of coupling segments.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
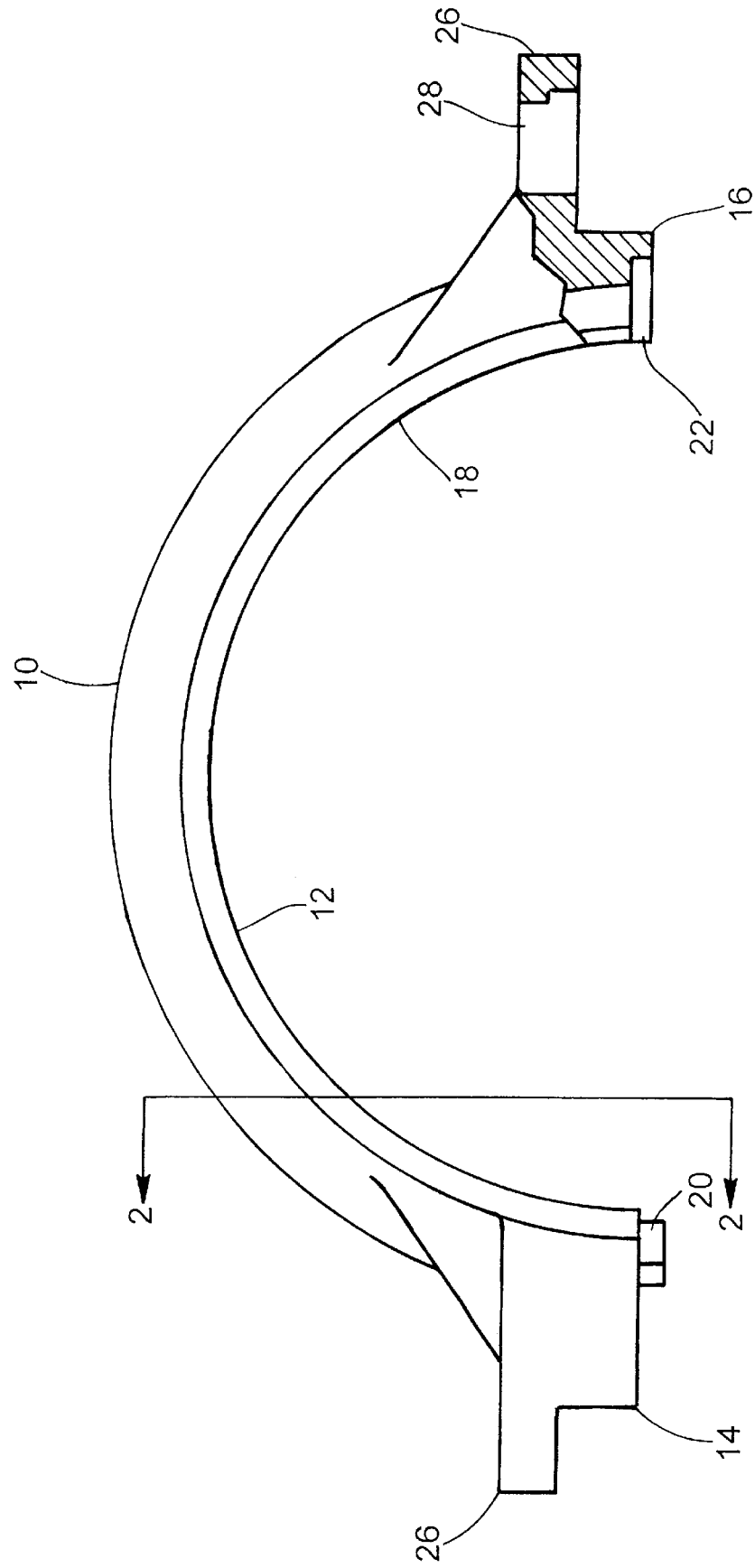
FIG. 1 is a partially broken, side elevational view of a first embodiment coupling segment of the present invention.

In the drawings, like numerals are used to indicate like elements throughout.

Figure 2:
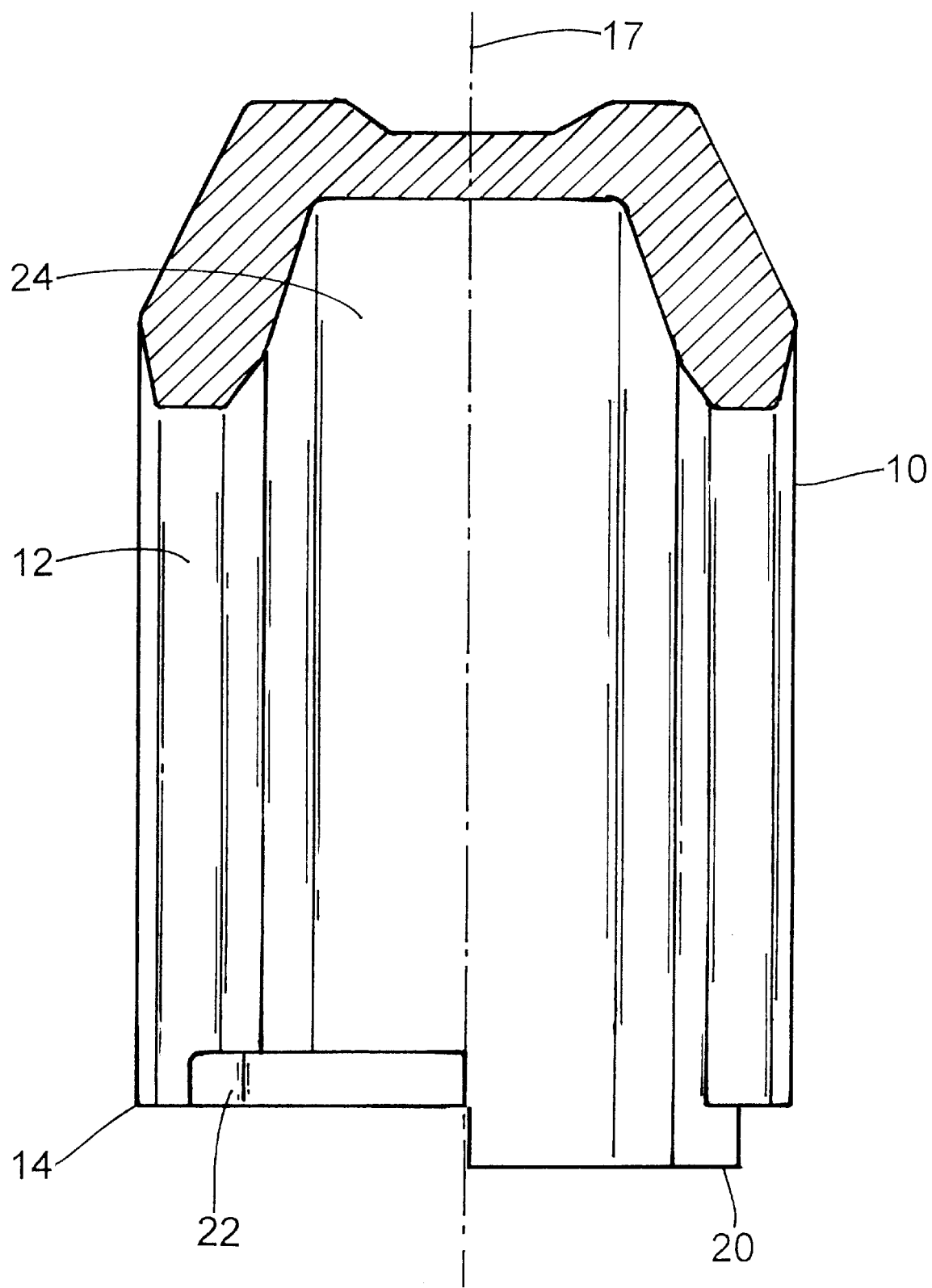
FIG. 2 is a sectional view taken along line 2—2 in FIG. 1.
Figure 3:
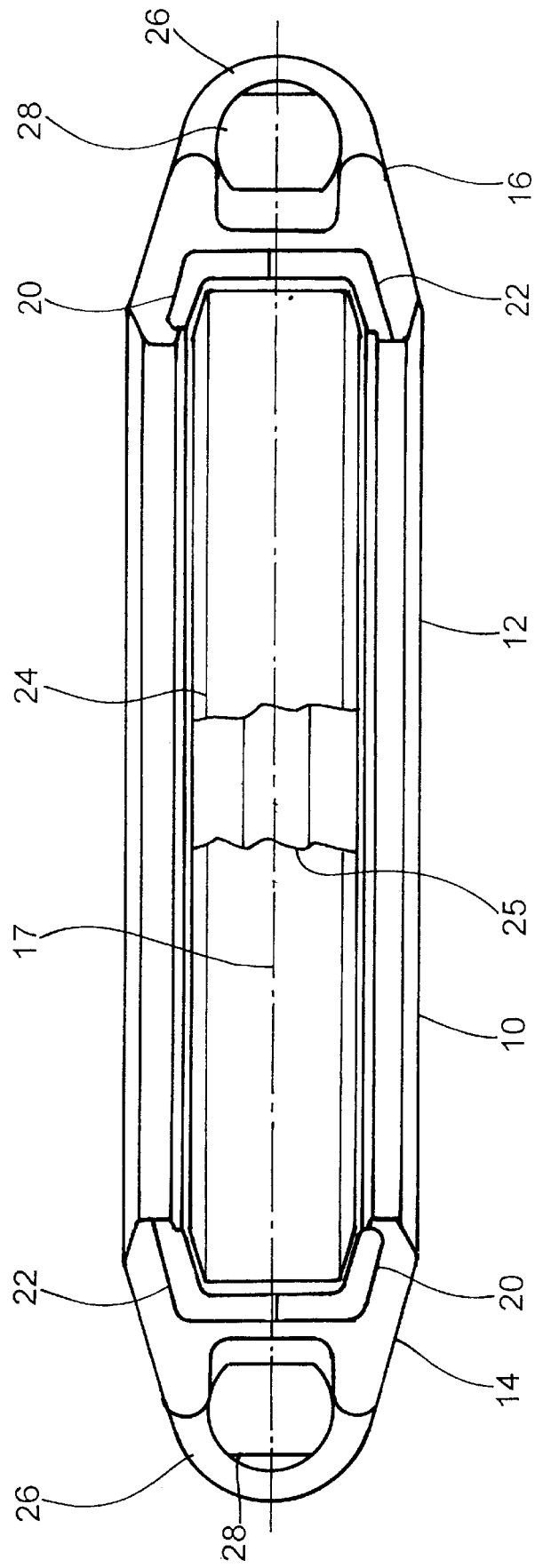
FIG. 3 is a bottom plan view of the embodiment of FIG. 1, including a partial section of a resilient seal.

FIGS. 1–3 show a first embodiment coupling segment 10 in accordance with the present invention. The coupling segment comprises an arcuate body 12 having a first end 14 and a second end 16. The body 12 has a concave surface 18 located between first end 14 and second end 16. A longitudinal central plane 17 extends through the body 12 from the first end 14 to the second end 16 parallel to the plane of FIG. 1 and perpendicular to the planes of FIGS. 2 and 3. A tongue 20 and a recess 22 are located side by side on each of first end 14 and second end 16. The tongue 20 is generally on an opposite side of the longitudinal central plane 17 from the recess 22. The positioning of the tongue 20 and the recess 22 are reversed with respect to the central plane 17 on the first end 14 with respect to the second end 16 of each segment 10. Each recess 22 is slightly larger than the tongue 20 to receive the tongue 20 of an identical coupling segment and form a tongue-and-recess interfit when the coupling segment 10 is coupled together with an identical coupling segment 10. It is understood that the shape of the tongue 20 and the shape of the recess 22 can be any shape such that the tongue 20 fits within the recess 22.

Referring to FIG. 3, a longitudinal channel 24 extends along the concave surface 18 from first end 14 to second end 16. The longitudinal channel 24 is designed to receive a resilient annular seal 25. Resilient annular seals are well known in the art. The annular seal 25 spans the ends of the two pipes which are being joined in a sealing relationship with the pipe ends.

Referring back to FIG. 1, embodiment 10 of the present invention has a flange 26 on each end 14, 16. Each flange 26 has a fastener hole 28 therethrough for the insertion of a mechanical fastener to join the coupling segment 10 to an adjacent identical coupling segment as is shown and will be described with respect to FIGS. 4 and 5.

The coupling segment is generally manufactured from ductile iron, but other materials generally used for manufacturing pipe couplings are acceptable.

Figure 4:
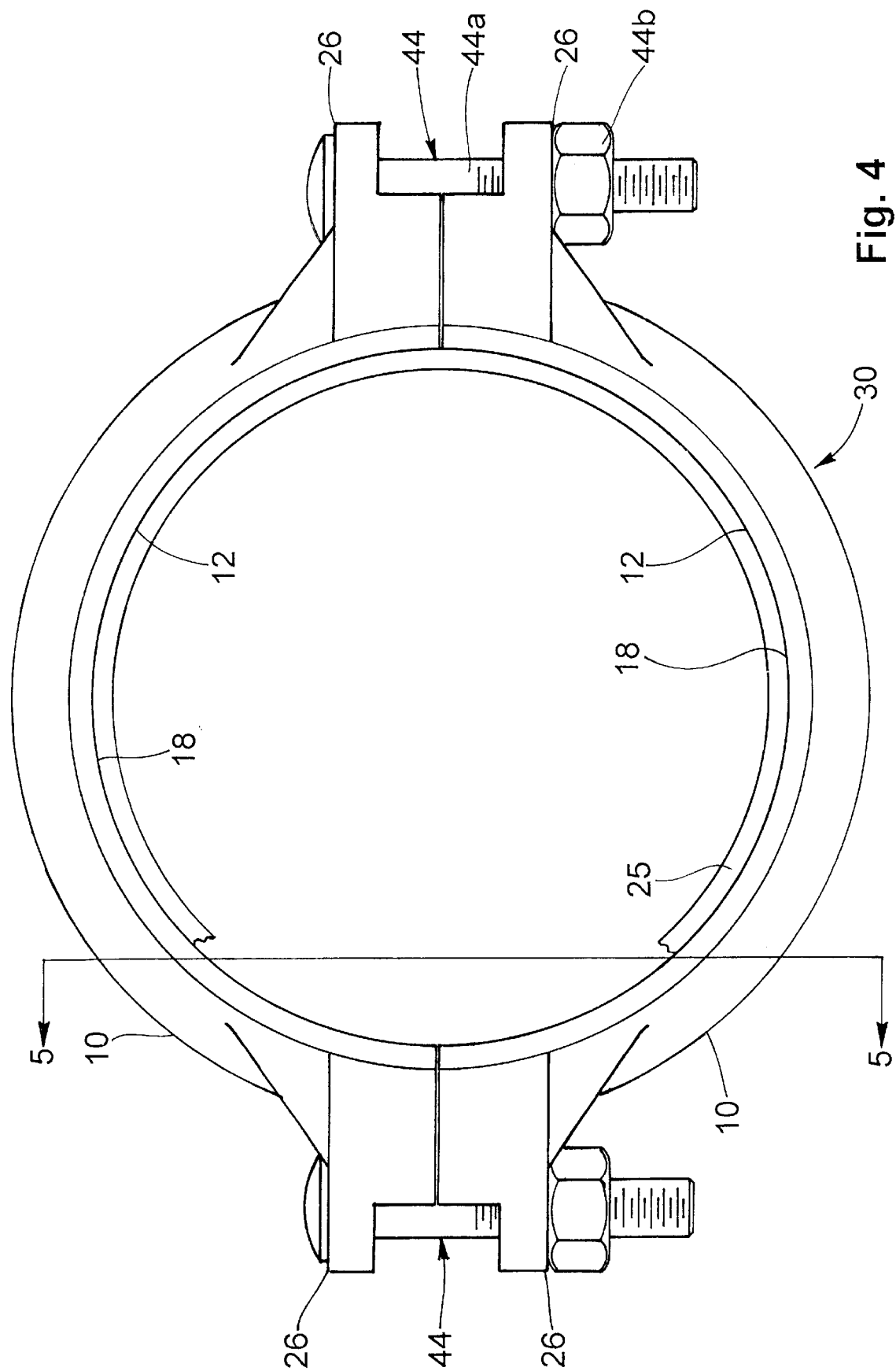
FIG. 4 is an elevational view of a first embodiment segmented pipe coupling of the present invention in its assembled condition.
Figure 5:
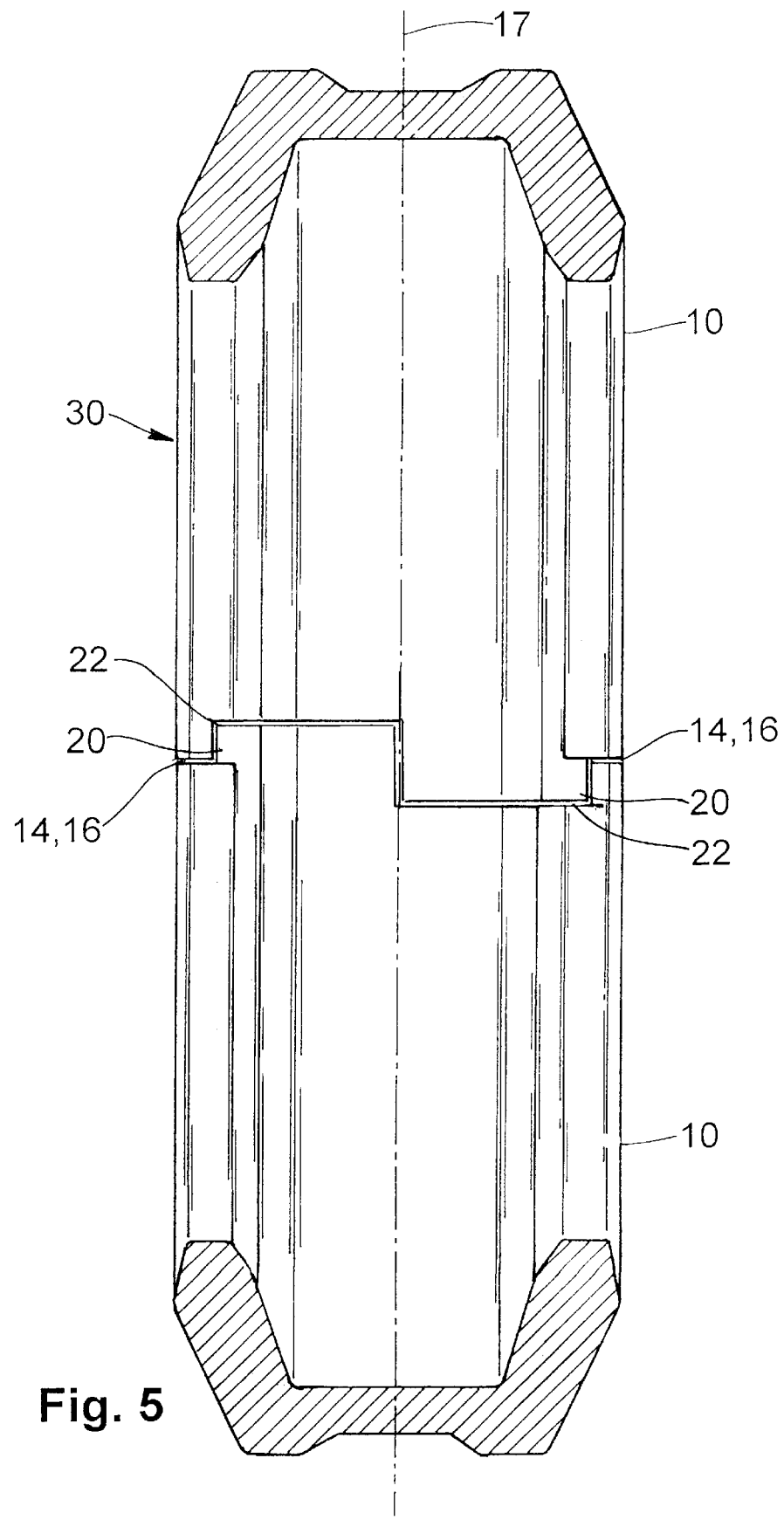
FIG. 5 is a sectional view taken along line 5—5 in FIG. 4.

As can be seen from FIGS. 4 and 5, a plurality of identical coupling segments 10 can be joined end to end to form a circular segmented pipe coupling 30. Prior to abutting an end of a first pipe (not shown) to an end of a second pipe (not shown), the annular seal 25 is slid over the end of the first pipe. The end of the first pipe is abutted to the end of the second pipe. The annular seal 25 is then slid over the abutting ends of the first and second pipes. The annular seal spans the abutting ends of the first and second pipes. A first coupling segment 10 is placed over part of the annular seal 25 such that the annular seal 25 fits into the longitudinal channel 24, and a second coupling segment 10 identical to the first coupling segment 10 is placed over the remaining exposed part of the annular seal 25 such that the longitudinal channel 24 of each coupling segment 10 fits over the annular seal 25. The resilient annular seal is thus located along an inner circumference of the coupling formed by the combination of the coupling segments 10. As the second coupling segment 10 is located over the annular seal 25, each end 14, 16 of the first coupling segment 10 is presented to either end 14, 16 of the second coupling segment 10. Each tongue 20 located at each end adjoining 14, 16 of each coupling segment 10 interfits into the recess 22 located on the adjoining end 14, 16 of each adjacent identical coupling segment. The interfit between the tongue 20 and the recess 22 is more readily demonstrated in FIG. 5. The advantage of this arrangement is that each end 14, 16 of a coupling segment 10 can be mated to either end 14 or 16 of an identical adjacent coupling segment 10 to form a properly fitting segmented pipe coupling 30.

Referring back to FIG. 4, a mechanical fastener 44, is located on an outer circumference of the coupling defined by the plurality of segments. In particular, mechanical fastener 44 is inserted through each fastener hole 28 of each flange 26 of each segment 10 and connects each coupling segment 10 to its identical adjacent coupling segment 10, forming segmented coupling 30. The mechanical fastener shown is a nut 44a and bolt 44b combination, but other fasteners known in the art may also be used. Thus, as the nut and bolt fastener 44 is tightened, the pipe coupling of the present invention provides a firm connection between the ends 14, 16 of each coupling segment 10 and the ends 14, 16 of the mating, identical coupling segment 10. Annular seal 25, which has been located over the ends of the first and second pipes as previously described herein, is thus compressed into engagement with the first and second pipes, forming a seal with the adjacent ends of each of the first and second pipes.

In an alternate embodiment (not shown) an annular seal 25 which is designed such that it can fit closely on the abutting pipes can be used. If such an annular seal 25 is used, the longitudinal channel 24 is not required on coupling segment 10. The annular seal 25 is placed over the pipe ends as previously described. One coupling segment 10 is placed over part of the annular seal 25 such that the annular seal 25 is compressed between coupling segment 10 and the ends of the first and second pipes, and a second coupling segment 10, identical to the one coupling segment 10, is placed over the remaining exposed part of the annular seal 25 such that the annular seal 25 is compressed between coupling segments 10 and the ends of the first and second pipes. As discussed above, as each coupling segment 10 is located over the annular seal 25, each end 14, 16 of the coupling segment 10 is presented to either end 14, 16 of the adjacent identical coupling segment 10. Each tongue 20 located on each of the ends 14, 16 of each coupling segment 10 interfits into the recess 22 located on the adjacent end 14, 16 of the adjacent coupling segment 10.

Figure 6:
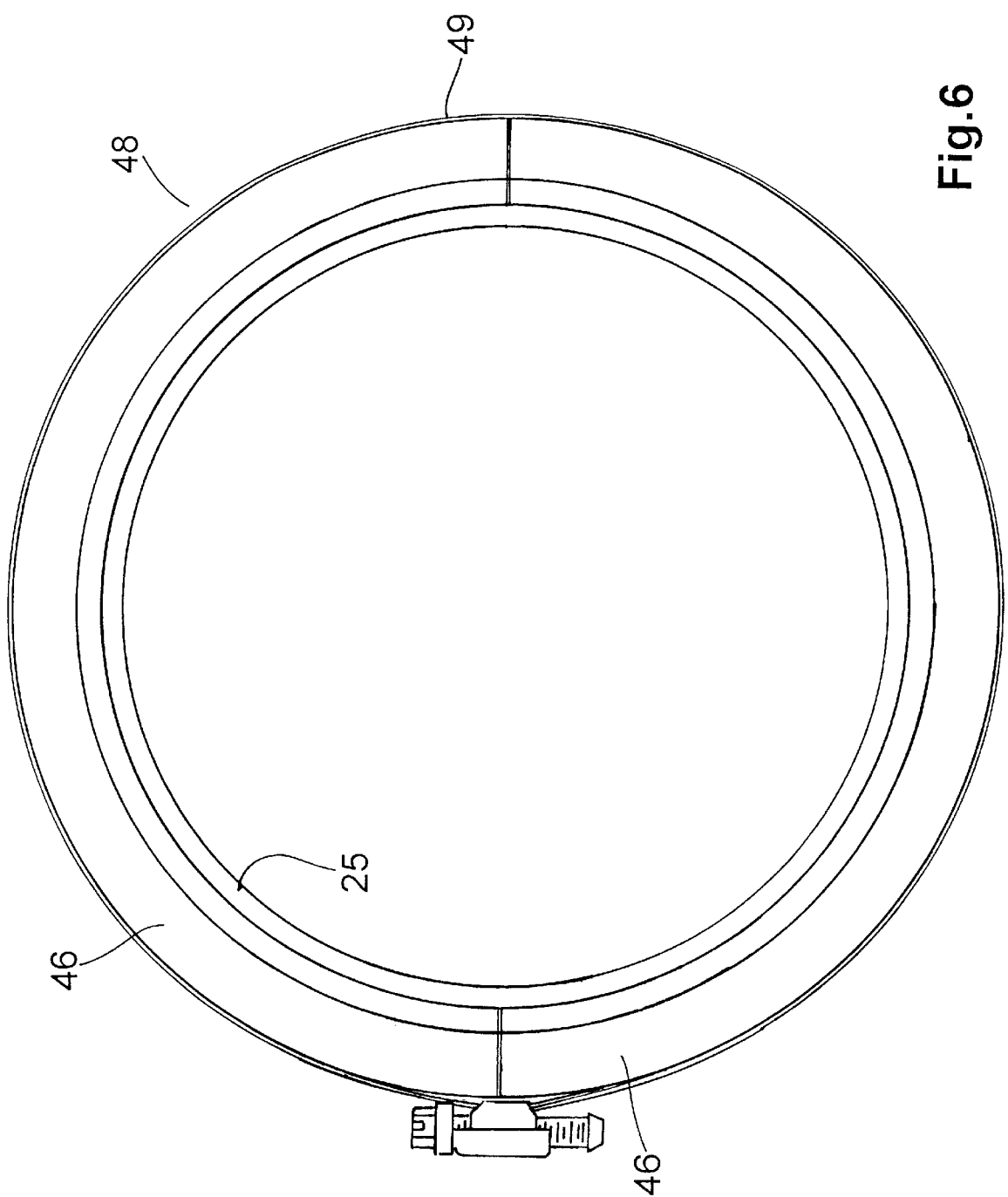
FIG. 6 is an elevational view of a second embodiment segmented pipe coupling of the present invention in its assembled condition.

In an alternate embodiment, shown in FIG. 6, identical coupling segments 46 are coupled together without flange 26. Identical coupling segments 46 form coupling 48 by locating one segment 46 over part of the annular seal 25 and by locating a second segment 46 over the remaining exposed part of annular seal 25. Coupling segments 46 are then secured together with a strap 49 encircling the outer circumference of the coupling 48 defined by the plurality of coupling segments 46. The tongue-and-recess arrangement as discussed above is again utilized on either end 14, 16 of each coupling segment 46 to form a more positive coupling engagement between coupling segments 46.

Figure 7:
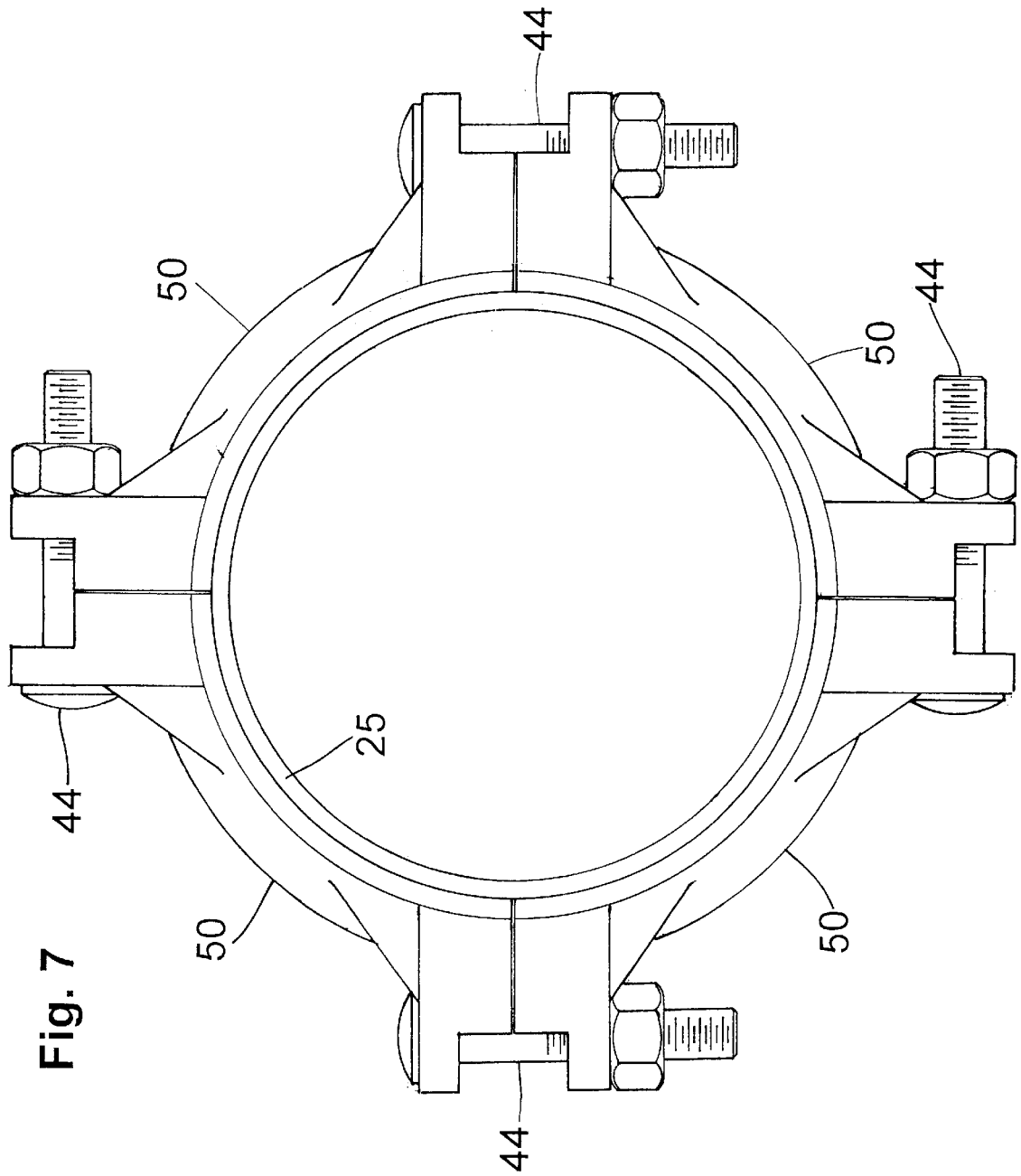
FIG. 7 is an elevational view of a third embodiment segmented pipe coupling of the present invention in its assembled condition.

In a further embodiment, as shown in FIG. 7, more than two identical coupling segments 50 are used (four being depicted) to form a complete segmented coupling 52. This may be necessitated by the size or the location of the pipes which are to be coupled. Although FIG. 7 shows four coupling segments, it is understood that any number of segments can be used. FIG. 7 also shows mechanical fasteners 44 connecting each segment to its adjacent segment. It is understood that other types of fasteners, such as, but not limited to, the strap 49 previously shown in FIG. 6, may also be used. It is understood, but not shown, that a combination of coupling segments which trace different arcs may be used, as long as the sum total arc of all coupling segments equals 360 degrees.

It will be appreciated by those skilled in the art that changes could be made to the embodiments described above and combinations of embodiments described above could be made without departing from the broad inventive concept thereof. It is understood, therefore, that this invention is not limited to the particular embodiments disclosed, but it is intended to cover modifications within the spirit and scope of the present invention as defined by the appended claims.

What I claim is:

1. A coupling segment comprising:

an arcuate body having a first end, a second end;

a concave surface extending between the first end and the second end;

a longitudinal central plane extending from the first end to the second end;

a tongue and a recess pair located side-by-side on each end, the tongue being generally on an opposite side of the longitudinal central plane from the recess, wherein the positioning of the tongue and recess are reversed with respect to the central plane at opposite ends of each segment, each recess being slightly larger than the tongue to receive the tongue of an identical coupling segment and form a tongue-recess interfit when the coupling segment is coupled together with an identical coupling segment; and each tongue having a tongue inner sidewall and each recess having a recess inner sidewall, the tongue inner sidewall and the recess inner sidewall for each side-by-side tongue and recess pair forming a generally circumferentially and radially extending common surface.

2. The coupling segment of claim 1 further comprising a longitudinal channel extending along the concave surface.

3. The coupling segment of claim 2 further comprising a flange on each of the first end and the second end, each flange having a fastener hole therethrough.

4. A segmented pipe coupling comprising the coupling segment of claim 2 in combination with:
  at least a second identical coupling segment identical to the coupling segment of claim 2, the pipe coupling being assembled with the first end of the coupling segment of claim 2 presented to either end of the second coupling segment, the tongue of each coupling segment interfitting into the recess of each adjacent identical coupling segment;
  a resilient annular seal located within the longitudinal channel of each coupling segment; and
  a mechanical fastener connecting each coupling segment to each adjacent coupling segment.

5. The segmented pipe coupling according to claim 4, wherein more than two identical coupling segments are utilized.

6. A segmented pipe coupling comprising the coupling segment of claim 3 in combination with:
  at least a second coupling segment identical to the coupling segment of claim 3, the pipe coupling being assembled with the first end of the coupling segment of claim 3 presented to either end of the second coupling segment, the tongue of each coupling segment interfitting into the recess of each adjacent coupling segment;
  a resilient annular seal located within the longitudinal channel of each coupling segment; and
  a mechanical fastener inserted through each fastener hole of each coupling segment and the fastener hole of each adjacent coupling segment.

7. The segmented pipe coupling of claim 6, wherein more than two identical coupling segments are utilized.

8. The coupling segment of claim 1 further comprising a flange on each of the first end and the second end, each flange having a fastener hole therethrough.

9. A segmented pipe coupling comprising the coupling segment of claim 8 in combination with:
  at least a second coupling segment identical to the coupling segment of claim 8, the pipe coupling being assembled with the first end of the coupling segment of claim 8 presented to either end of the second coupling segment, the tongue of each coupling segment interfitting into the recess of each adjacent identical coupling segment; and
  a mechanical fastener inserted through each fastener hole of each coupling segment and the fastener hole of each adjacent coupling segment.

10. The segmented pipe coupling of claim 9, wherein more than two identical coupling segments are utilized.

11. A segmented pipe coupling comprising the coupling segment of claim 1 in combination with:
  at least a second identical coupling segment identical to the coupling segment of claim 1, the pipe coupling being assembled with the first end of the coupling segment of claim 1 presented to either end of the second coupling segment, the tongue of each coupling segment interfitting into the recess of each adjacent identical coupling segment;
  a resilient annular seal located along an inner circumference formed by the combination of the coupling segment with at least the second coupling segment; and
  a mechanical fastener connecting each coupling segment to each adjacent coupling segment.

12. The segmented pipe coupling of claim 11 wherein more than two identical coupling segments are utilized.

13. The coupling segment of claim 1, wherein the tongue sidewall is generally parallel to the central plane and the recess sidewall is generally parallel to the central plane.

14. A circular segmented pipe coupling comprising:
  a plurality of identical coupling segments, each segment having an arcuate body, each arcuate body having a first end and a second end, a longitudinal central plane extending from the first end to the second end, each end having a tongue and a recess pair located side-by-side on each end, the tongue being generally on an opposite side of the longitudinal central plane from the recess, wherein the positioning of the tongue and the recess are reversed with respect to the central plane at opposite ends of each segment, the plurality of identical segments, joined end-to-end, with the tongue of each end of each coupling segment interfitted into the recess of an adjoining end of each adjacent identical coupling segment of the plurality;
  a mechanical fastener located on an outer circumference of the coupling defined by the plurality of coupling segments; and
  each tongue having a tongue inner sidewall and each recess having a recess inner sidewall, the tongue inner sidewall and the recess inner sidewall for each side-by-side tongue and recess pair forming a generally circumferentially and radially extending common surface.

15. The segmented pipe coupling of claim 14 in combination with a resilient annular seal located along an inner circumference defined by the plurality of coupling segments.

16. The segmented pipe coupling of claim 15 wherein the mechanical fastener is a nut and bolt combination.

17. The segmented pipe coupling of claim 15 wherein the mechanical fastener comprises a strap encircling the outer circumference.

18. The segmented pipe coupling of claim 14 wherein the mechanical fastener is a nut and bolt combination.

19. The segmented pipe coupling of claim 14 wherein the mechanical fastener comprises a strap encircling the outer circumference.

20. The circular segmented pipe coupling of claim 14, wherein the tongue sidewall is generally parallel to the central plane and the recess sidewall is generally parallel to the central plane.

21. A coupling segment comprising:
  an arcuate body having a first end, a second end;
  a concave surface extending between the first end and the second end;
  a longitudinal central plane extending from the first end to the second end;
  a tongue and a recess pair located side-by-side on each end, the tongue being generally on an opposite side of the longitudinal central plane from the recess, wherein the positioning of the tongue and recess are reversed with respect to the central plane at opposite ends of each segment, each recess being slightly larger than the tongue to receive the tongue of an identical coupling segment and form a tongue-recess interfit when the coupling segment is coupled together with an identical coupling segment; and
  each tongue having a tongue inner sidewall adjoining the central plane and each recess having a recess inner sidewall adjoining the central plane and adjoining the inner sidewall of the tongue of the pair sufficiently closely to the inner sidewall of the tongue of the pair that another tongue inner sidewall from an identical coupling segment contacting the tongue inner sidewall of the pair is positioned directly opposite the recess of the pair.

22. A circular segmented pipe coupling comprising:

a plurality of identical coupling segments, each segment having an arcuate body, each arcuate body having a first end and a second end, a longitudinal central plane extending from the first end to the second end, each end having a tongue and a recess pair located side-by-side on each end, the tongue being generally on an opposite side of the longitudinal central plane from the recess, wherein the positioning of the tongue and the recess are reversed with respect to the central plane at opposite ends of each segment, the plurality of identical segments, joined end-to-end, with the tongue of each end of each coupling segment interfitted into the recess of an adjoining end of each adjacent identical coupling segment of the plurality;

a mechanical fastener located on an outer circumference of the coupling defined by the plurality of coupling segments; and each tongue having a tongue inner sidewall adjoining the central plane and each recess having a recess inner sidewall adjoining the central plane and adjoining the inner sidewall of the tongue of the pair sufficiently closely to the inner sidewall of the tongue of the pair that another tongue inner sidewall from an identical coupling segment contacting the tongue inner sidewall of the pair is positioned directly opposite the recess of the pair.

* * * * *